(12) United States Patent
Yamazaki

(10) Patent No.: US 7,311,327 B2
(45) Date of Patent: Dec. 25, 2007

(54) OCCUPANT PROTECTION APPARATUS

(75) Inventor: Yasunobu Yamazaki, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 237 days.

(21) Appl. No.: 10/737,745

(22) Filed: Dec. 18, 2003

(65) Prior Publication Data

US 2004/0124623 A1 Jul. 1, 2004

(30) Foreign Application Priority Data

Dec. 25, 2002 (JP) ............... P 2002-375199

(51) Int. Cl.
*B60R 21/045* (2006.01)
(52) U.S. Cl. .................... 280/752; 280/751
(58) Field of Classification Search ........... 280/752, 280/751
See application file for complete search history.

(56) References Cited

U.S. PATENT DOCUMENTS

| | | | | |
|---|---|---|---|---|
| 2,412,603 A * | 12/1946 | Clement | ............... | 220/320 |
| 4,349,214 A * | 9/1982 | Inasawa et al. | ............... | 280/752 |
| 4,373,746 A * | 2/1983 | Okuyama | ............... | 280/752 |
| 5,071,162 A * | 12/1991 | Takagawa | ............... | 280/752 |
| 5,413,379 A * | 5/1995 | Koma | ............... | 280/752 |
| 5,431,442 A * | 7/1995 | Tomita et al. | ............... | 280/752 |
| 5,482,319 A * | 1/1996 | Yoshimura et al. | ............... | 280/752 |
| 5,577,770 A * | 11/1996 | Sinner et al. | ............... | 280/752 |
| 5,676,216 A * | 10/1997 | Palma et al. | ............... | 180/90 |
| 5,865,468 A * | 2/1999 | Hur | ............... | 280/752 |
| 5,931,520 A * | 8/1999 | Seksaria et al. | ............... | 296/70 |
| 5,937,501 A * | 8/1999 | Imgram | ............... | 29/525 |
| 5,951,045 A * | 9/1999 | Almefelt et al. | ............... | 280/748 |
| 6,014,988 A * | 1/2000 | Gagnon et al. | ............... | 138/168 |
| 6,142,522 A * | 11/2000 | Bossenmaier et al. | ............... | 280/752 |
| 6,170,872 B1 * | 1/2001 | Bair et al. | ............... | 280/751 |
| 6,196,588 B1 * | 3/2001 | Sugawara | ............... | 280/779 |
| 6,213,504 B1 * | 4/2001 | Isano et al. | ............... | 280/748 |
| 6,299,208 B1 * | 10/2001 | Kasahara et al. | ............... | 280/752 |
| 6,474,687 B2 * | 11/2002 | Cappabianca et al. | ............... | 280/752 |
| 6,491,322 B1 * | 12/2002 | Ryner | ............... | 280/751 |
| 6,883,833 B2 * | 4/2005 | Yamazaki et al. | ............... | 280/751 |
| 2001/0035640 A1 * | 11/2001 | Cappabianca et al. | ............... | 280/752 |
| 2002/0166720 A1 * | 11/2002 | Kusabiraki et al. | ............... | 181/240 |

FOREIGN PATENT DOCUMENTS

| | | |
|---|---|---|
| JP | 6-37010 U | 5/1994 |
| JP | 7-61307 A | 3/1995 |
| JP | 9-86318 A | 3/1997 |
| JP | 2000-344037 A | 12/2000 |

\* cited by examiner

*Primary Examiner*—Eric Culbreth
*Assistant Examiner*—Barry Gooden, Jr.
(74) *Attorney, Agent, or Firm*—Birch, Stewart, Kolasch & Birch, LLP

(57) ABSTRACT

An occupant protection apparatus has a panel which constitutes part of a passenger compartment side surface of an instrument panel and which is separatable from the instrument panel to move when at least a knee load of an occupant is inputted. There are a plurality of support members which face transverse end portions of the panel, respectively, and which have a rigidity higher than that of the instrument panel.

18 Claims, 5 Drawing Sheets

OCCUPANT PROTECTION APPARATUS

CROSS REFERENCE TO RELATED APPLICATION

This non-provisional application incorporates by reference the subject matter of Application No. 2002-375199 filed in Japan on Dec. 25, 2002, on which a priority claim is based under 35 U.S.C. §119(a).

BACKGROUND OF THE INVENTION

1. Field of the invention

The present invention relates to an occupant protection apparatus for protecting an occupant when the knee load of the occupant is inputted to an instrument panel.

2. Description of the Related Art

A vehicle is equipped with seat belts and air bags for protecting the chests and heads of occupants at the time of collision or knee protectors for protecting the knees of the occupants at the time of collision. JP-UM-A-6-37010 discloses a technique as a related art of knee protectors.

In the related art, arms and brackets are mounted on an instrument panel beam that is mounted on a vehicle body side. Furthermore, an upper reinforcement member, which faces a glove box, is attached to a distal end of the arm. In addition, a lower reinforcement member is attached to a lower end of the bracket. The upper reinforcement member, the brackets (side reinforcement members) and the lower reinforcement member constitute a structure which faces annularly a circumferential edge of an opening in the instrument panel, and these reinforcement members are constructed so as to buckle to deform when the knees of an occupant collide against a lid of the glove box.

In the related art, however, a load applied to the lid of the glove box needs to be absorbed by a number of members such as the upper reinforcement member, the brackets (side reinforcement members) and the lower reinforcement member. Consequently, work is needed for arranging all the members in the interior of the instrument panel behind the glove box. In addition, man-hours for fabricating the individual members are needed, and managing the quality of each member is needed as well.

SUMMARY OF THE INVENTION

An object of the invention is to provide an occupant protection apparatus for effectively absorbing an impact load applied to the knees of an occupant facing an instrument panel with a simple construction.

According to the present invention, there is provided an occupant protection apparatus having: a panel which constitutes part of a passenger compartment side surface of an instrument panel and which is separatable from the instrument panel to move when at least the knee load of an occupant is inputted; and a plurality of support members which face transverse end portions of the panel, respectively, and which have a rigidity higher than that of the panel.

DETAILED DESCRIPTION OF THE INVENTION

A first embodiment according to the invention will be described below with reference to the accompanying drawings.

Figure 1:
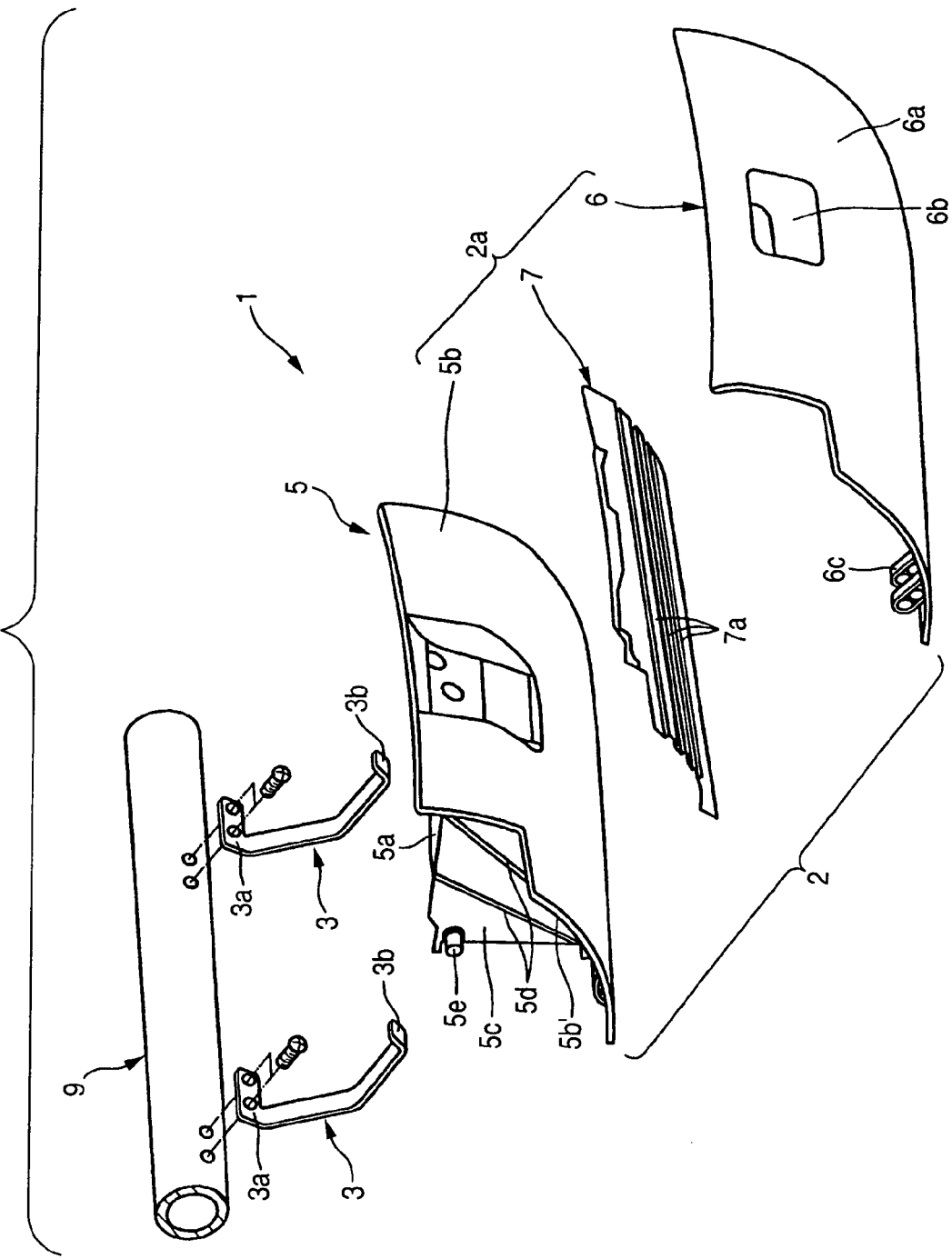
FIG. 1 is a perspective view showing the assembly of an occupant protection apparatus according to a first embodiment of the invention.
Figure 2:
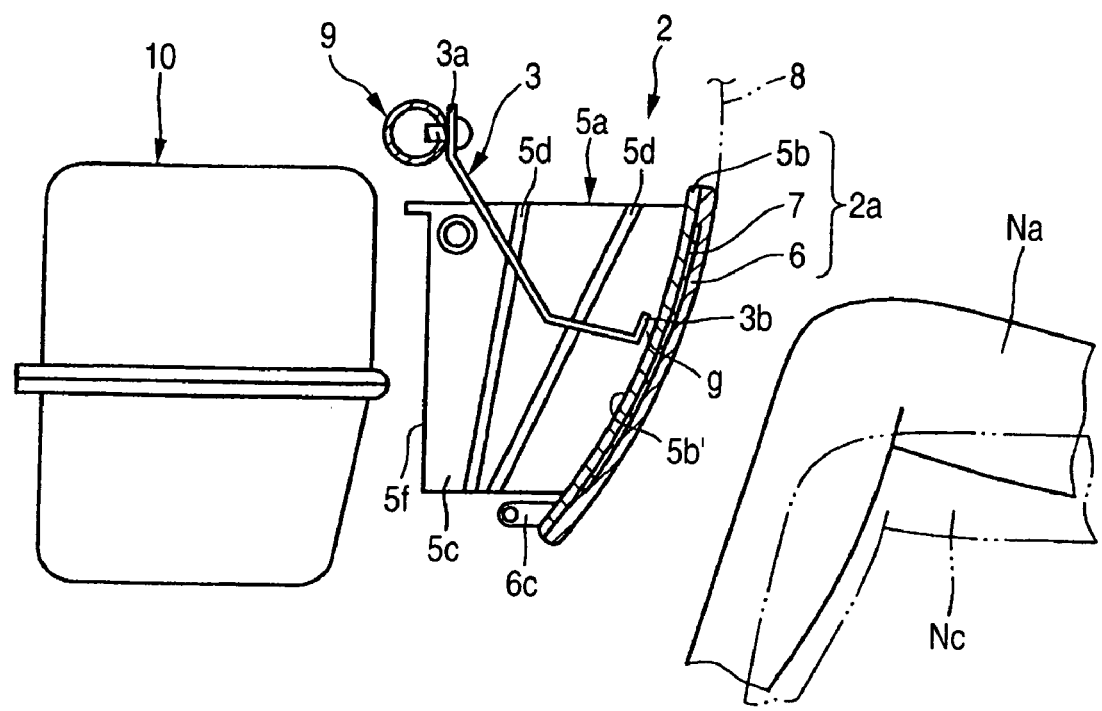
FIG. 2 is a cross-sectional view showing a state in which the occupant protection apparatus shown in FIG. 1 is installed on a vehicle.
Figure 3:
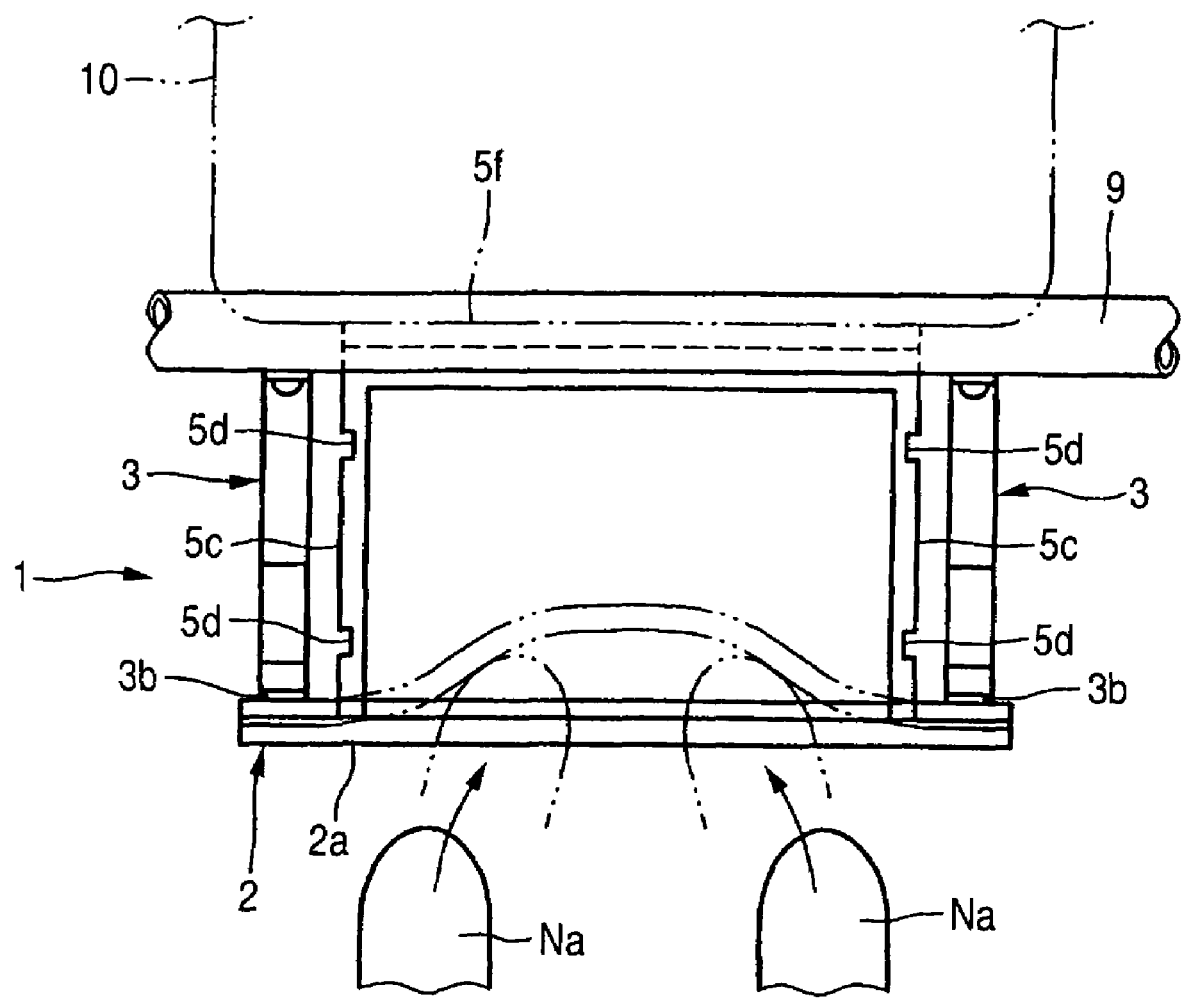
FIG. 3 is an explanatory view showing a condition of the occupant protection apparatus shown in FIG. 2 which results when a vehicle collides.

FIG. 1 is a perspective view showing the assembly of an occupant protection apparatus according to a first embodiment of the invention, FIG. 2 is a cross-sectional view showing a state in which the occupant protection apparatus shown in FIG. 1 is installed on a vehicle, and FIG. 3 is an explanatory view showing a condition of the occupant protection apparatus shown in FIG. 2 which results when a vehicle collides. As shown in FIG. 1, an occupant protection apparatus 1 includes a glove box 2 and a pair of support members 3, 3. The glove box 2 includes a glove box main body 5 as a box portion, an outer panel 6 and an insert panel 7. The glove box main body 5 is formed such that a circumferential edge portion of an inner panel 5b which forms a front wall of a box portion 5a having an upward opening protrudes vertically and horizontally in a flange-like fashion.

Grooves 5d are provided so as to be aligned back and forth on an outer surface of each side wall 5c in such a manner as to extend from an upper end to a lower end of the outer surface. As shown in FIG. 2, these two grooves 5d are arranged according to the shape of the side wall 5c such as in a substantially V-like fashion in which the grooves 5d are spaced widely away from each other at the upper end and are made closer to each other at the lower end. These grooves 5d are designed to break when an initial knee load (an impact load) is applied to the inner panel 5b side so that the side wall 5c is collapsed or the side wall 5c easily deforms (bends). In addition, the grooves are set to have optimal depth and width for collapse by the initial knee load regardless of differences in quality and thickness of a resin member for use for the side wall 5c, variation in molding, and differences in environmental temperature (heat) of regions where a vehicle is driven such as a high-temperature region and a cold region. According to these features, a knee load applied to the inner panel 5b is suppressed to a lowest level. Note that the groove 5b may be formed into a square cross-sectional shape as shown in FIG. 3 or may be formed into a V-like cross-sectional shape. Namely, any cross-sectional shape may be adopted as long as the side wall 5c easily breaks or deforms when a knee load is applied to the inner panel 5b. A guiding shaft 5e is provided so as to protrude in a corner portion at a rear end of an upper portion of each side portion 5b. The glove box main body 5 is molded integrally of a resin.

The outer panel 6 is mounted on a front surface of the inner panel 5b of the glove box main body 5 and is formed into substantially the same shape as that of the inner panel 5b. In addition, a mounting portion 6b for an opening/closing mechanism is provided at a central position in an upper portion of a front surface 6a of the outer panel 6 and a hinge portion 6c is provided at a central position at a lower end on a back surface of the outer panel 6. This outer panel 6 is also molded of a resin.

The insert panel 7 is formed into a shape which is slightly smaller than the inner panel 5b of the glove box main body 5, and ribs 7a each having a U-like cross section are provided transversely in parallel and in multiple stages from a top position to a bottom position on the insert panel 7. The ribs 7a are set such that the heights of the ribs 7a lower gradually from the top side rib toward the bottom side rib and the pitches or intervals between the ribs 7a narrow gradually from the top side rib toward the bottom side rib, whereby a cross-sectional secondary moment of the insert panel 7 decreases gradually from the top toward the bottom of the insert panel 7. Namely, the insert panel 7 is formed into a shape in which the impact absorbing capability is decreased gradually from the top to the bottom thereof. The insert panel 7 is a metallic panel which is formed through sheet metal processing. Note that the cross-sectional shape of the ribs 7a is not limited to the U-like cross section but may be formed into a waveform-like cross section. The insert panel 7 is interposed between the inner panel 5b of the glove box main body 5 and the outer panel 6 and these members are jointly fastened and fixed together (FIG. 2). In this manner, a front wall 2a is constructed as a panel of the glove box 2.

The glove box 2 is disposed at a lower position of the instrument panel 8 (FIG. 2) so as to face a front-row passenger seat. The glove box 2 is supported on a vehicle body side via the hinge portions 6c on the outer panel 6. The guiding shafts 5e provided in upper end corner portions of the side walls 5c of the glove box main body 5 respectively are brought into engagement with guide grooves in guide members, not shown, which are provided on the vehicle body side for support therein, so that the glove box 2 can be smoothly opened and closed toward and from the front-row passenger seat side. In addition, an air conditioner 10 is installed longitudinally ahead of the glove box 2, and a rear wall 5f of the box portion 5a confronts the air conditioner 10 with a slight gap being provided therebetween.

The support member 3 is a metallic sheet-like member, and a proximal end 3a is fixed to a deck crossmember 9 which is a reinforcement member of the vehicle body, whereas a front or distal end 3b is bent upwardly so as to constitute an abutment surface with a side portion on a back surface 5b' of the inner panel 5b of the glove box main body 5. In other words, the support member 3 is made to extend toward the front wall 2a which is a panel. This support member 3 is formed of a thick sheet metal and is formed strongly and rigidly so as not to be deformed easily. In particular, the support member 3 is preferably made three times or more thicker than the insert panel 7.

As shown in FIG. 2, in the pair of support members 3, the proximal portions 3a are fixed to the deck crossmember 9, respectively, central portions are made to extend forward by the side walls 5c of the glove box main body 5 with a slight gap being provided therebetween. Each of the distal end portions 3b is spaced away from and confront with a substantially central position of the side portion on the back surface 5b' of the inner panel 5b which protrudes from the side walls 5c with a gap g (of the order of 10 mm) being provided therebetween in a state in which the glove box 2 is closed. In this way, the occupant protection apparatus 1 is constructed.

The function of the occupant protection apparatus that has been described heretofore will be described below.

As shown in FIGS. 2 and 3, a person of large build, for example, an adult male is seated in the front-row passenger seat, and the knee portions Na of the occupant are spaced away from and confront with the front wall 2a of the glove box 2 while the knee portions Na are being spaced away from each other. In case a vehicle is brought into a head-on collision, the knee portions Na of the occupant move forward, whereby a knee load is applied to the front wall 2a of the glove box 2, and the glove box 2 moves forward by the gap g. Then, the central portions of the side portions on the back surface 5' of the inner panel 5b are brought into abutment with the distal end portions 3b of the support members 3, whereby the forward movement of the glove box 2 is restricted thereat.

In the event that the knee load is further applied to the front wall 2a, the front wall 2a does not break but curvedly deforms together with the insert panel 7 in such a manner that a central portion thereof protrudes toward the front of the vehicle as indicated by double-dashed lines in FIG. 3 with the distal end portions 3b of the left and right support members 3 acting as a fulcrum, whereas, while moving inwardly or toward each other as indicated by arrows, the knee portions Na press and deform the front wall 2a as indicated by double-dashed lines since the central portion of the front wall 2a protrudes toward the front of the vehicle. This is because the support members 3 do not buckle to deform but the front wall 2a bends curvedly due to the rigidity of the support members 3 being higher than that of the front wall 2a of the glove box 2. The forward movement of the glove box 2 is restricted when the side wall portions 5c are pushed forward as the front wall 2a curvedly deforms toward the front of the vehicle, whereby the rear wall 5f is brought into abutment with the air conditioner 10. As a result, the side walls 5c break at the grooves 5d and then collapse. That is, the side walls 5c break at the grooves 5d and then collapse by the initial knee load regardless of the variation of the knee load properties. Since the side portions of the front wall 2a are restricted from moving toward the front of the vehicle by the support members 3, the front wall 2a is prevented from colliding against the air conditioner 10, whereby the front wall 2a does not break but deforms together with the insert panel 7 according to the knee load applied so as to absorb the knee load to thereby protect the knee portions Na.

The front wall 2a may be formed of a resin member only. In this case, however, when a knee load is inputted, since the front wall 2a largely deforms in an initial stage of the load input, there may occur a case where a large knee load cannot be absorbed properly. The insert panel 7 enhances the rigidity of the front wall 2a when compared with a case where the front wall 2a is formed only of a resin member and allows the front wall 2a to absorb an impact sufficiently even in case a large knee load is inputted.

In addition, as shown by the double-dashed lines in FIG. 2, in the event that a person of small build, for example, a child or female is seated in the front-row passenger seat and the knee portions Nc are brought into collision against a position in the vicinity of a lower portion of the front wall 2a of the glove box 2, or in the event that the behavior of the knee portions Na of the adult male passenger varies and thus the knee portions Na are brought into collision against the position in the vicinity of the lower portion of the front wall 2a of the glove box 2, since the impact absorbing capability of the insert panel 7 is set to decrease from the upper portion toward the lower portion of the front wall 2a, even if the knee portions Nc or Na are brought into collision against the lower portion of the front wall 2a, the front wall 2a deforms according to the magnitude of the knee load so as to effectively absorb the knee load, so that the glove box 2 can protect the knee portions regardless of the build of the occupant.

While in the embodiment, the distal end portions 3b of the support members 3 are made to face the side portions on the back surface 5b' of the inner panel 5b of the glove box 2 with the slight gap being provided therebetween in the state in which the glove box 2 is closed, the distal end portions may be in abutment with the side portions. With the slight gap being provided between the side portions on the back surface 5b' of the inner panel 5b and the distal end portions 3b of the support members 3 as described in the embodiment, in the event that the knee portions are brought into collision with the front wall 2a due to any other reason than the collision of a vehicle, the deformation of the front wall 2a can be prevented.

In addition, since the support members 3 support the front wall 2a without interference with the glove box main body 5 when the vehicle collides, the deformation of the front wall 2a can sufficiently be supported.

Figure 4:
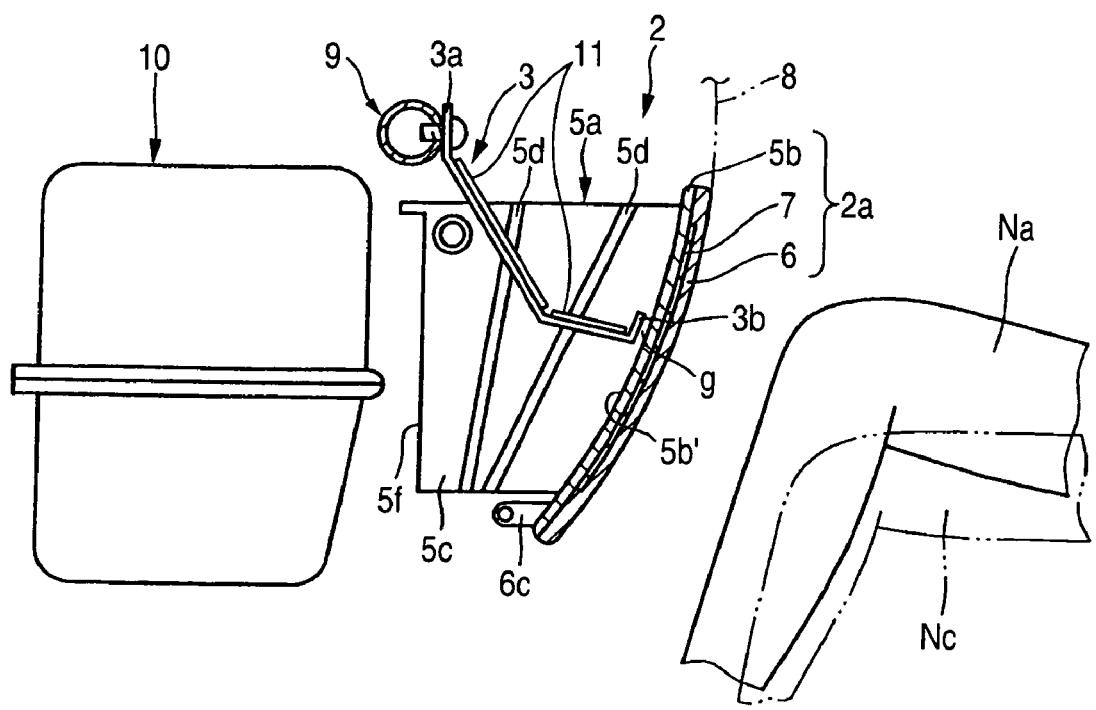
FIG. 4 is an explanatory view of an occupant protection apparatus according to a second embodiment of the invention.

Next, a second embodiment will be described based on FIG. 4. Since this embodiment is identical in construction to the first embodiment that has been described previously except for the constructions of support members 3 and an insert panel 7, like reference numerals are given to like constituent components to those described with respect to the first embodiment, and the description thereof will be omitted.

In this embodiment, a bead 11 or rib is provided on the surface of sheet metal of a support member 3 in a longitudinal direction of the support member 3. The bead may be formed by sheet metal processing to extend in the longitudinal direction and to have a triangular shaped cross section. In this case, the back side of the bead 11 is recessed. Since the bead 11 can enhance the rigidity of the support member 3 remarkably, the thickness of the support member can be reduced to the same level in thickness of an insert panel.

In addition, as a construction for enhancing the rigidity of the support member 3, a U-shaped cross section or a closed cross section may be adopted. The adoption of such a cross section can allow the required rigidity to be provided even if a thin sheet metal is used for the support member 3, and therefore it is effective in reducing the size and weight of the apparatus.

Note that the other function and advantage of this embodiment are identical to those of the first embodiment that has been described previously.

Figure 5:
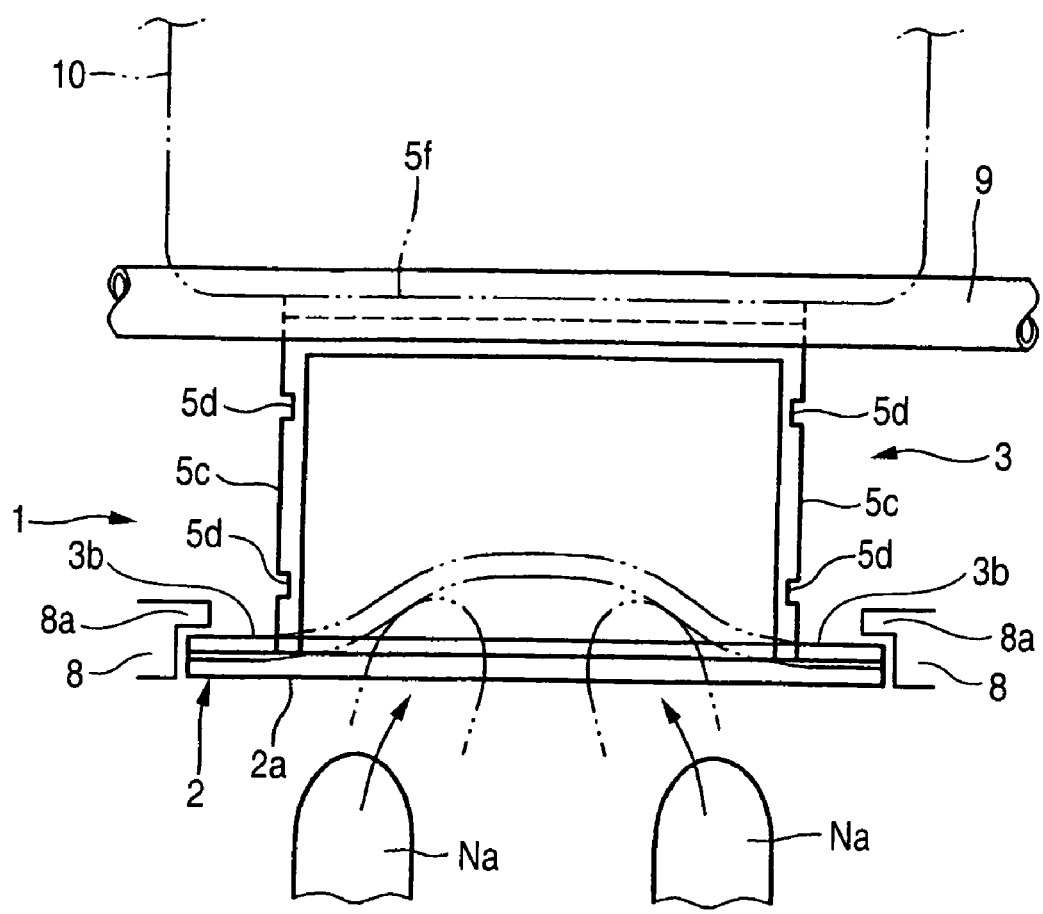
FIG. 5 is an explanatory view of an occupant protection apparatus according to a third embodiment of the invention.

Furthermore, a third embodiment will be described based on FIG. 5. The difference in construction between this embodiment and the first embodiment is that a support member of this embodiment is not a plate-like member such as used in the first embodiment in which the proximal end portion 3a is fixed to the deck crossmember 9 but is an end portion 8a of an instrument panel 8 which supports a back surface of a glove box 2 at each of transverse ends of the glove box 2.

To be specific, a step which recedes by a distance equal to the thickness of a front wall 2a of the glove box from the surface of a passenger compartment side of the instrument panel is provided at each end portion 8a of an opening in the instrument panel. In addition, a distance over which the end portion 8a overlaps the front wall 2a is made to be a sufficient distance for the end portion 8a to support the front wall 2a when a knee load is inputted into the front wall 2a.

While the instrument panel 8 is made from a resin, the rigidity thereof can be enhanced higher than that of the front wall 2a by increasing sufficiently the thickness at the end portion 8a or using a harder resin for forming the instrument panel 8.

According to this construction, even in the event that a knee load of the occupant is inputted into the front wall 2a, the end portions 8a can function as the support members and the glove box 2 can absorb an impact when the front wall 2a is allowed to curvedly deform to the front of the vehicle.

Note that the other function and advantage of this embodiment are identical to those of the first embodiment that has been described previously.

The invention should not be limited to the embodiments that have been described heretofore, and the invention may be, needless to say, modified variously without departing from the spirit and scope thereof.

What is claimed is:

1. An occupant protection apparatus, comprising:
   a panel which extends in a transverse direction of a vehicle, the panel constituting a part of an instrument panel arranged separable from a rest of the instrument panel when at least a knee load of an occupant is inputted to the panel, the panel including,
      an outer panel,
      an inner panel, constituting a part of a glove box main body having a pair of side walls extending towards a front of the vehicle, and
      a metallic panel interposed between the inner panel and the outer panel;
   a plurality of support members which face transverse end portions of the inner panel, respectively, and which have a rigidity higher than that of the panel,
   wherein the metallic panel is provided with a plurality of ribs that extend in the transverse direction of the vehicle, an interval between adjacent ribs gradually reduces from an interval at a top side of the metallic panel toward an interval at a bottom side of the metallic panel.

2. The occupant protection apparatus as set forth in claim 1, wherein when the knee load is inputted, the panel curvedly deforms in such a manner that a central portion thereof protrudes toward the front of the vehicle.

3. The occupant protection apparatus as set forth in claim 2, wherein the plurality of support members comprise two sheet members which are fixed to a reinforcement member of a vehicle body at one end thereof, which extend in a longitudinal direction of the vehicle and which face the transverse end portions of the panel at the other end thereof.

4. The occupant protection apparatus as set forth in claim 3, wherein the plurality of support members are disposed to confront the panel with a box portion of the glove box being held therebetween.

5. The occupant protection apparatus as set forth in claim 4, wherein the glove box is formed of a resin member such that when an initial knee load is applied to the outer panel, the side walls of the glove box collapse.

6. The occupant protection apparatus as set forth in claim 1, wherein the plurality of support members are support end portions which are formed integrally with the instrument panel at an opening in the instrument panel.

7. The occupant protection apparatus as set forth in claim 1, wherein each of the plurality of support members is at least three times as thick as the metallic panel disposed inside the panel.

8. The occupant protection apparatus as set forth in claim 1, wherein each one of plurality the support members does not substantially deform due to an input of said at least a knee load during a vehicle collision.

9. The occupant protection apparatus as set forth in claim 3, wherein
the outer panel is formed of a resin and disposed on a passenger compartment side, and
the inner panel is formed of a resin and disposed on an inner side of the instrument panel.

10. The occupant protection apparatus as set forth in claim 9, wherein the metallic panel is formed into a configuration in which an impact absorbing capability thereof decreases from an upper portion toward a lower portion thereof.

11. The occupant protection apparatus as set forth in claim 10, wherein the metallic panel is provided with the plurality of ribs that extend in the transverse direction of the vehicle, a height of each rib gradually reduces from a rib at a top side of the metallic panel toward a rib at a bottom side of the metallic panel.

12. The occupant protection apparatus as set forth in claim 9, wherein plurality of the support members are formed of a metal and are thicker than the metallic panel.

13. The occupant protection apparatus as set forth in claim 3, wherein the panel is formed of a resin, and the plurality of support members are formed of a sheet metal.

14. The occupant protection apparatus as set forth in claim 3, wherein each of the support members has a bead formed longitudinally.

15. The occupant protection apparatus as set forth in claim 4, wherein the glove box has the pair of side walls extending along the longitudinal direction of the vehicle, each side wall having at least one groove extending from an upper end to a lower end of the side wall to reduce a strength of the side wall.

16. The occupant protection apparatus as set forth in claim 15, wherein each side wall of the glove box has two grooves extending from the upper end to the lower end of the side wall, the grooves are provided in a substantially V-like fashion, such that the grooves are spaced widely away from each other at the upper end and closer at the lower end.

17. The occupant protection apparatus as set forth in claim 4, wherein a gap is formed between the two support members and the panel when the glove box is closed.

18. An occupant, protection apparatus, comprising:
a glove box main body having a panel the extends in a transverse direction of a vehicle and constituting a part of an instrument panel, and a pair of side walls extending from the panel, each side wall being provided with a groove, the panel being arranged separable from a rest of the instrument panel when at least a knee load of an occupant is inputted to the panel; and
a plurality of support members which face transverse end portions of the panel, respectively, and which have a rigidity higher than that of the panel,
wherein when the knee load is inputted, the panel curvedly deforms in such a manner that a central portion thereof protrudes toward the front of the vehicle,
wherein the plurality of support members comprise two sheet members which are fixed to a reinforcement member of a vehicle body at one end thereof, which extend in a longitudinal direction of the vehicle and which face the transverse end portions of the panel at the other end thereof,
wherein the panel comprises:
an outer panel formed of a resin and disposed on a passenger compartment side;
an inner panel formed of a resin and disposed on an inner side of the instrument panel; and
a metallic panel interposed between the inner panel and the outer panel,
wherein the metallic panel is formed into a configuration in which an impact absorbing capability thereof decreases from an upper portion toward a lower portion thereof, and
wherein the metallic panel is provided with a plurality of ribs that extend in the transverse direction of the vehicle, an interval between adjacent ribs gradually reduces from an interval at a top side of the metallic panel toward an interval at a bottom side of the metallic panel.

* * * * *